(No Model.)

R. GRISWOLD.
APPARATUS FOR UNLOADING HAY AND GRAIN.

No. 287,667. Patented Oct. 30, 1883.

WITNESSES:
Chas. Niola
C. Sedgwick

INVENTOR:
R. Griswold
BY Munn & Co
ATTORNEYS.

N. PETERS. Photo-Lithographer, Washington, D. C.

UNITED STATES PATENT OFFICE.

ROBERT GRISWOLD, OF WOODEY, KANSAS.

APPARATUS FOR UNLOADING HAY AND GRAIN.

SPECIFICATION forming part of Letters Patent No. 287,667, dated October 30, 1883.

Application filed May 18, 1883. (No model.)

*To all whom it may concern:*

Be it known that I, ROBERT GRISWOLD, of Woodey, in the county of Lincoln and State of Kansas, have invented a new and Improved Apparatus for Unloading Hay and Grain, of which the following is a full, clear, and exact description.

Reference is to be had to the accompanying drawings, forming part of this specification, in which similar letters of reference indicate corresponding parts in all the figures.

Figure 1:
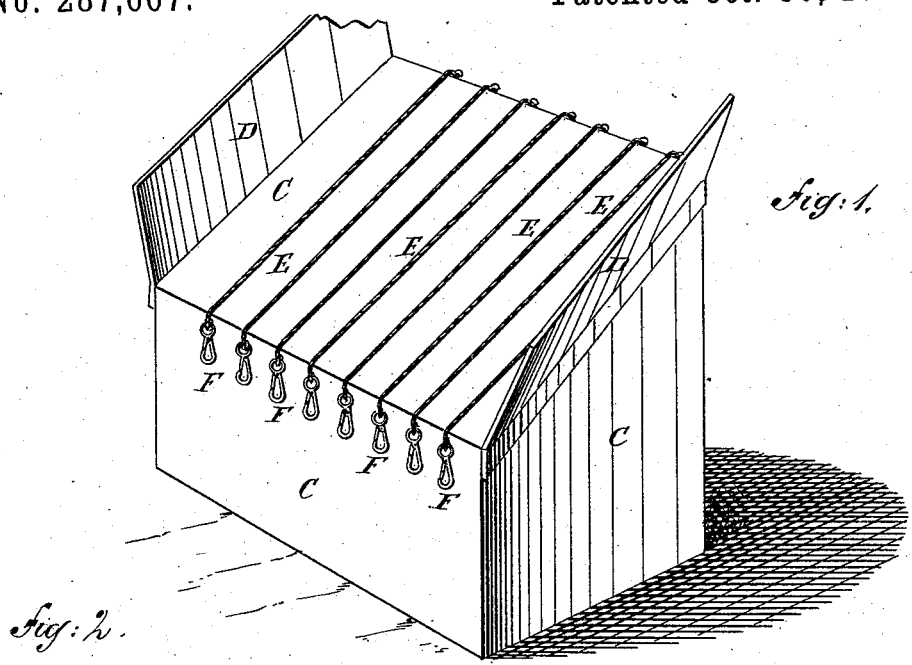
Figure 2:
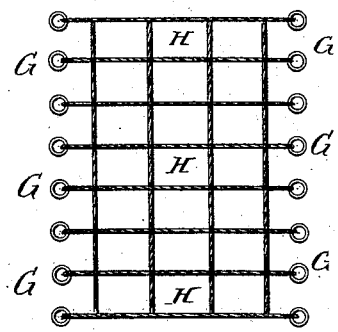
Figure 3:
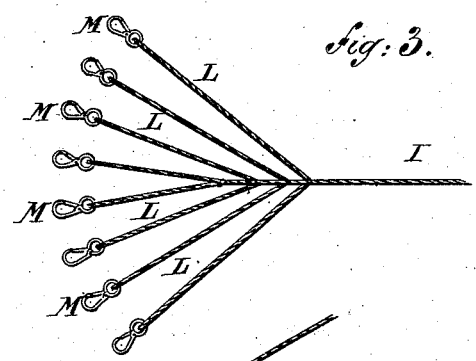
Figure 4:
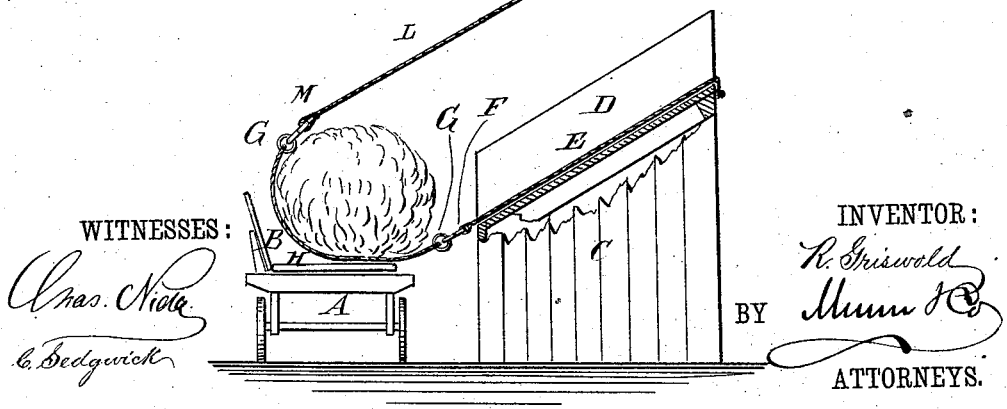

Figure 1 is a perspective view of the unloading-platform. Fig. 2 is a plan view of the netting to be placed upon the wagon-rack under the load. Fig. 3 is a plan view of the branched end of the draw-rope. Fig. 4 is a view illustrating the use of my improved apparatus, part of the platform being broken away.

The object of this invention is to facilitate the unloading of hay and grain.

The invention consists in the portable platform constructed with ropes attached at one end to the upper edge of the platform, and provided with snap-hooks at their lower ends, to engage with rings attached to the inner edge of the netting placed upon the wagon-rack beneath the load. The draw-rope is constructed with branches graded in length, each outer branch terminating sooner than its adjacent inner branch, and provided with snap-hooks to engage with the rings at the outer edge of the netting, whereby the ends of the load will be made to move a little in advance of the body of the said load, as will be hereinafter fully described.

A represents a wagon.

B is the wagon-rack, the sides of which are so formed that they can be conveniently detached to allow the load to be readily rolled off the said rack.

C is a portable platform, which is designed to be placed at the side of the place where the stack is to be built, and which is made with an inclined top, up which the load of hay or grain is to be rolled, and is provided with guards D, to keep the said load from rolling off the sides of the said platform.

To the upper edge of the inclined platform C are attached the upper ends of ropes E, which pass down the said platform, and have snap-hooks F attached to their lower ends, to engage with rings G, attached to the adjacent edge of the netting H. The netting H is designed to be placed upon the rack B to receive the load, and has rings G attached to both its side edges, as shown in Figs. 2 and 4.

I is the draw or unloading rope, to the outer end of which horses or other convenient power is designed to be attached, and which will be passed over the platform C and the stack upon which the hay is deposited.

To the inner end of the rope I are attached branch ropes L, which have snap-hooks M attached to their ends, and are graded in length, so that the center branch or branches extend a little the farthest, and each outer branch terminates a little sooner than its adjacent inner branch, as shown in Fig. 3. By this construction, when a loaded wagon has been driven along the lower side of the platform C, the side of the rack B adjacent to the said platform is removed, the snap-hooks F are hooked into the rings G of the adjacent edge of the netting H, and the snap-hooks M of the branches L of the draw-rope I are hooked into the rings G of the outer edge of the netting H. Then, when power is applied to the draw-rope I, the load of hay or grain will be rolled off the wagon-rack B up the platform C, and will fall from the upper edge of the said platform upon the stack, the graded lengths of the branch ropes L causing the ends of the load to start first and to keep a little in advance of the body of the said load, so that it will roll up the platform C readily.

Having thus fully described my invention, I claim as new and desire to secure by Letters Patent—

1. In an apparatus for unloading hay and grain, the portable platform C, constructed substantially as herein shown and described, with ropes E, attached at one end to the upper edge of the platform, and provided with snap-hooks F at their lower ends, to engage with rings G, attached to the inner edge of the netting H, placed upon the wagon-rack beneath the load, as set forth.

2. In an apparatus for unloading hay and grain, the draw-rope I, constructed substantially as herein shown and described, with the branches L, graded in length, each outer branch terminating sooner than its adjacent inner branch, and provided with snap-hooks M, to engage with the rings G, at the outer edge of the netting H, whereby the ends of the load will be made to move a little in advance of the body of the said load, as set forth.

3. The combination, in an unloading apparatus, of the portable platform C, having attached ropes E F, the netting H, having rings G, and the draw-rope I, with branched end ropes, L, having hooks M, arranged with the outer hooks nearer the point of draft than the successive adjacent inner hooks, substantially as shown and described.

ROBERT GRISWOLD.

Witnesses:
 A. MARSHALL,
 C. W. HARRIS.